(12) United States Patent
Lloyd

(10) Patent No.: US 8,918,798 B2
(45) Date of Patent: Dec. 23, 2014

(54) SHARED OBJECT LOCK UNDER STATE MACHINE CONTROL

(75) Inventor: David Lloyd, Belleville, WI (US)

(73) Assignee: Red Hat, Inc., Raleigh, NC (US)

( * ) Notice: Subject to any disclaimer, the term of this patent is extended or adjusted under 35 U.S.C. 154(b) by 1108 days.

(21) Appl. No.: 12/201,255

(22) Filed: Aug. 29, 2008

(65) Prior Publication Data

US 2010/0058337 A1   Mar. 4, 2010

(51) Int. Cl.
 G06F 3/00 (2006.01)
 G06F 9/52 (2006.01)
(52) U.S. Cl.
 CPC .......... *G06F 9/526* (2013.01); *G06F 2209/522* (2013.01)
 USPC ............... 719/315; 718/1; 718/100; 718/101; 718/102; 718/103; 718/104; 718/105; 718/106; 718/107
(58) Field of Classification Search
 None
 See application file for complete search history.

(56) References Cited

U.S. PATENT DOCUMENTS

| 7,047,322 B1* | 5/2006 | Bauman et al. ............ 710/6 |
| 2002/0129178 A1* | 9/2002 | Steere et al. ............ 709/315 |
| 2003/0097360 A1* | 5/2003 | McGuire et al. ............ 707/8 |
| 2003/0126187 A1* | 7/2003 | Won et al. ............ 709/107 |
| 2004/0054861 A1* | 3/2004 | Harres ............ 711/163 |
| 2005/0114609 A1* | 5/2005 | Shorb ............ 711/152 |
| 2008/0016278 A1* | 1/2008 | Clark et al. ............ 711/118 |
| 2008/0016279 A1* | 1/2008 | Clark et al. ............ 711/118 |

OTHER PUBLICATIONS

Dibyendu Majumdar; http://simpledbm.googlecode.com/hg/simpledbm-rss/code/simpledbm-rss/src/main/java/org/simpledbm/rss/impl/latch/NewReadWriteUpdateLatch.java; Dec. 23, 2006.*

* cited by examiner

*Primary Examiner* — Emerson Puente
*Assistant Examiner* — Dong Kim
(74) *Attorney, Agent, or Firm* — Lowenstein Sandler LLP

(57) ABSTRACT

Embodiments relate to systems and methods for a shared object lock under state machine control. An operating system or virtual machine environment can host a set of multiple executing threads, and provide those threads with mutual access to one or more objects such as storage objects, memory objects, or others. The threads can independently request that the object be locked or unlocked, and the locked or unlocked state can be shared between the threads. Rather than communicate with the object(s) directly, in embodiments the threads communicate with a state machine that in turn controls the state of the object(s). When a request to change the state of the object(s) is received, the state machine can permit the object(s) to change between locked, unlocked, or other states based on the current state of the machine and the received message. Contention between threads can be reduced or eliminated.

18 Claims, 4 Drawing Sheets

SHARED OBJECT LOCK UNDER STATE MACHINE CONTROL

FIELD

The present teachings relate to systems and methods for a shared object lock under state machine control, and more particularly to platforms and techniques for operating a state machine configured to communicate with and manage objects shared between multiple executing threads.

BACKGROUND OF RELATED ART

In the context of multi-threaded software execution, it is necessary to coordinate the access of executing threads to the resources of a system. For example, an operating system or virtual machine environment can manage multiple program threads or other executing processes, some of which may wish to access resources such as disk storage or network port access at the same time. The operating system or environment may as a result incorporate a thread scheduler to control the order in which threads can access the objects.

Serializing the access to objects can entail some drawbacks, however. Those include coherency or latency problems since one thread may gain access to an object only after another has modified that object, but each may depend on the current state of the object or its data. In some environments, such as certain versions of the Java™ run-time environment, a mechanism is provided by which a shared lock can be placed on an object, such as a disk access object. In such implementations, one thread or process can place a lock on an object, but other threads can share access to that same object while it is locked. Similarly, one thread can unlock the object on behalf of all threads sharing control of the object, to restore access to other processes. However, even in platforms employing a shared-lock mechanism, there can be difficulties in the control of the shared object, including because there is no independent control mechanism to coordinate the locking and unlocking of the object, apart from the threads themselves. It may be desirable to provide methods and systems for a shared object lock operating under separate logical control.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for operating a shared object lock under state machine control. More particularly, embodiments relate to platforms and techniques for generating a state machine coupled to one or more objects that are accessible to multiple executing threads. The threads can be applications or other programs running under an operating system or in a virtual machine environment. The multiple executing threads can share control of the one or more objects. Each thread can, for instance, transmit a message to the state machine requesting that the object take on a desired state. That state can be or include, for example, a locked state or an unlocked state. The remaining objects can for example share access to the object while it is locked. The requests for various states of the object or transitions from one state to another can all be communicated via the state machine. The state machine can receive those inputs from one or more threads, and based on a set of data including the requests, the state of the state machine, and/or the state of the object, can generate a decision regarding the transition from a current state to a next state of the object. In cases, the state machine can cause the object to maintain a current state. In cases, the state machine can cause the object to change from a first state to a second or other state. In embodiments, each state of the state machine can be associated with or correspond to a defined object class. These and other embodiments described herein address the various noted shortcomings in known object sharing technology, and provide a programmer or other user with an enhanced ability to manage the execution of threads and ensure better coherency in the state of the object and/or data generated by the object.

Reference will now be made in detail to exemplary embodiments of the present teachings, which are illustrated in the accompanying drawings. Where possible the same reference numbers will be used throughout the drawings to refer to the same or like parts.

Figure 1:
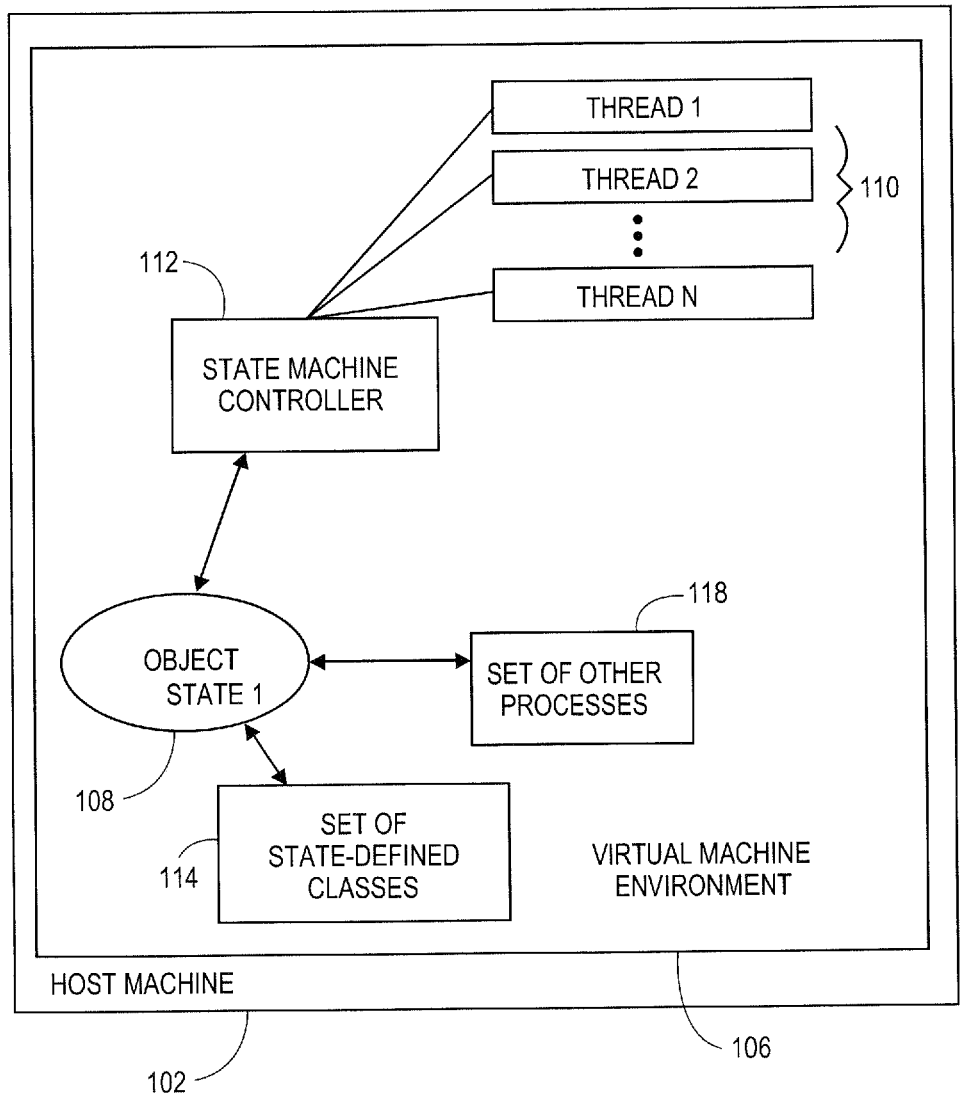
FIG. 1 illustrates an overall system for a shared object lock under state machine control, according to various embodiments.

FIG. 1 illustrates an overall system 100 including host machine 102, in which systems and methods for a shared object lock operating under state machine control can be operated, according to embodiments. In embodiments as shown, a host machine 102 can be configured with a set of resources including a virtual machine environment 106 in which a set of multiple threads 110 can execute. In embodiments, host machine 102 can be or include, for example, a client or server machine, a cellular telephone, a media device, or other device or machine. Virtual machine environment 106 can, in embodiments, be or include a version of the Java™ virtual machine environment. In embodiments, virtual machine environment 106 can be or include other environments or run-time resources, such as application programming interfaces (APIs) that provide resources to permit applications or other software to transparently execute under different operating systems or platforms, while being hosted on other platforms.

In embodiments as shown, virtual machine environment 106 can host or access a set of multiple threads 110, such as executing process threads of applications or other software. The set of multiple threads 110 can communicate with a state machine controller 112. The set of multiple threads 110 can, in general, share access to object 108 in a common or shared state of that resource. State machine controller 112 can in turn communicate with an object 108. Object 108 can represent a defined resource of virtual machine environment 106, such as a disk-access object, an input/output (I/O) object, a memory object, or other object or resource available under virtual machine environment 106.

Object 108 can exist in any one of a set of multiple states. Each state of object 108 can be defined by one class in a set of state-defining classes 114. For instance, a first state of object 108 can be a locked state. In embodiments where object 108 is or includes, for instance, a disk access object, a locked state of object 108 can indicate that the set of multiple threads 110 can access the underlying hardware disk or other storage and write or read data, whereas a set of other processes 118 running under virtual machine environment can not. A state of object 108 can similarly include an unlocked state, in which set of multiple threads 110 as well as set of other processes 118 can access object 108, including the underlying storage hardware. Other objects, states, and executing processes are possible. For example, states of object 108 can include a cached state or an uncached state, for instance related to the state of data stored in a database. In embodiments as shown, any thread in set of multiple threads 110 can transmit a request to state machine controller 112 to request that object 108 be placed or transitioned into a desired state, on a shared basis with the remaining threads of set of multiple threads 110.

Figure 2:
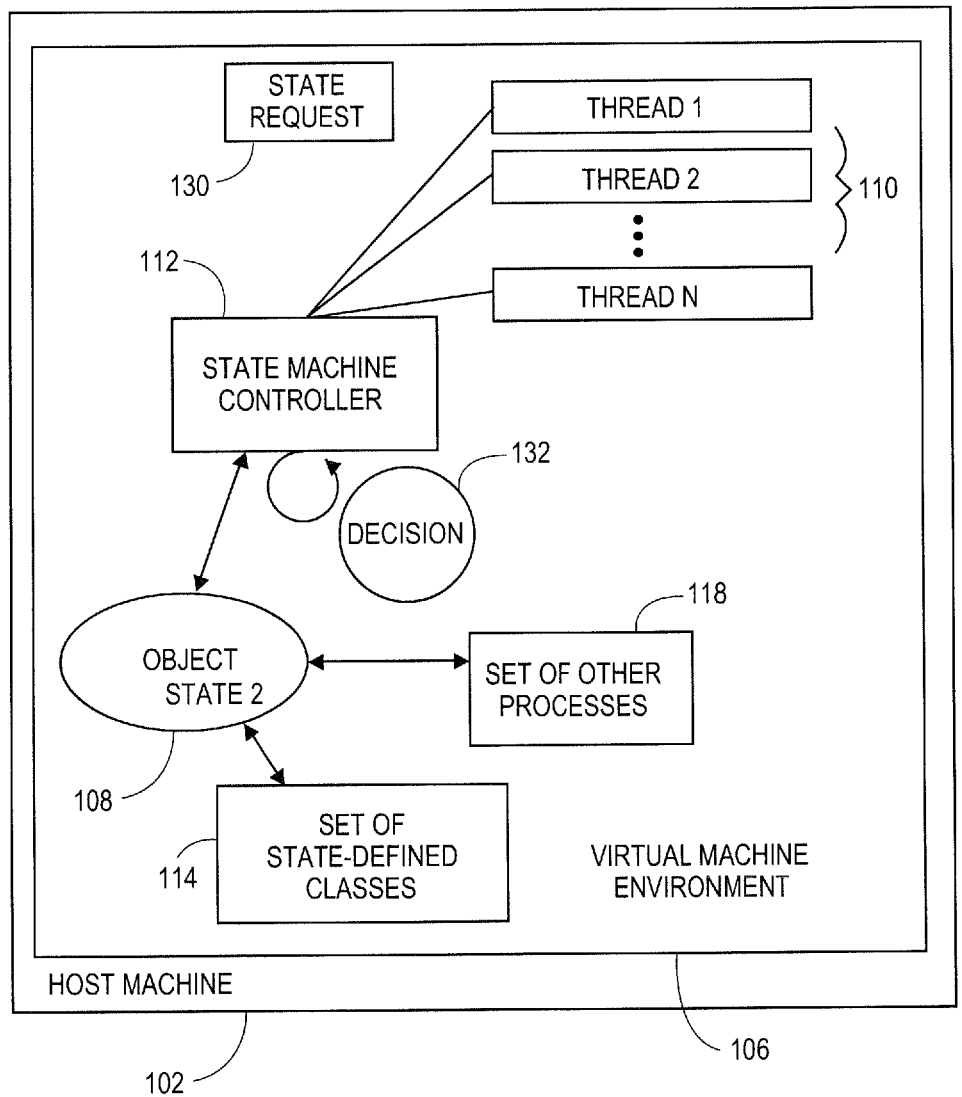
FIG. 2 illustrates a system for a shared object lock under state machine control in further regards, according to various embodiments.

More particularly, as illustrated in FIG. 2, any one or more thread in set of multiple threads 110 can transmit a state request 130 to state machine controller 112. For instance, a thread can request that object 108 be placed into a locked state. State machine controller 112 can then generate a transition decision 132 based on state request 130, a current state of object 108, and/or a current state of state machine controller 112. According to embodiments, transition decision 132 can be for instance generated by state machine controller 112 using the following class definitions and associated logic, or others.

According to embodiments, a single state machine controller 112 can be set up for each object 108 to be controlled. In embodiments, a class can be defined called "AtomicStateMachine", whose instances are used to manage the state of each controlled object 108. Every object class that is to be controlled by a state machine controller 112 in this way in one regard can have an associated enumerated type, which represents the list of possible states. This enumerated type can be used as the generic type parameter to AtomicStateMachine instance, which can then be used to hold the state machine controller 112 in a certain state (using for example a read lock internally), or can be used to transition to a new state (using for example a write lock internally).

According to embodiments, a set of relevant methods for the AtomicStateMachine<T extends Enum<T>& State<T>>class include the following:

TABLE 1

(General)

* public static <T extends Enum<T> & State<T>>
AtomicStateMachine<T> start(T initialState);
 Creates a new AtomicStateMachine instance and
 places it into an initial state.

TABLE 2

(Transition Methods)

The methods ending in "Hold" will acquire the shared (read) lock if successful. The methods ending in "Exclusive" will acquire the exclusive (write) lock if successful. Failure to acquire the lock results in failure of the overall method.
* public boolean transition(T state);
* public boolean transitionHold(T state);
* public boolean transitionExclusive(T state);
Acquire the write lock, and attempt to transition to the given state. If the state machine controller 112 is already in the target state, these methods return "false" and no locks are acquired. For all three methods, the exclusive lock is acquired to make a change to the state machine controller 112. The method chosen simply selects how (or whether) the lock is downgraded.
* public boolean transition(T fromState, T toState);
* public boolean transitionHold(T fromState, T toState);
* public boolean transitionExclusive(T fromState, T toState);
Similar to the prior three methods, but these require that the state machine controller 112 be in the "fromState" before proceeding to the "toState". If not, "false" is returned and no locks are acquired.
* public void requireTransition(T state);
* public void requireTransitionHold(T state);
* public void requireTransitionExclusive(T state);
* public void requireTransition(T fromState, T toState);
* public void requireTransitionHold(T fromState, T toState);
* public void requireTransitionExclusive(T fromState, T toState);
These six methods are the same as the prior six. However in this case, rather than returning "false" on failure, an exception is thrown.
* public void requireHold(T state);
This method requires that the state machine controller 112 be in a certain state. If so, the shared lock is acquired; if not, an exception is thrown.

TABLE 3

(Release Methods)

* public void release( );
* public void releaseExclusive( );
* public void releaseDowngrade( );
Release a lock. The release( ) method releases a shared lock (i.e. the current state is "unpinned"),
releaseExclusive( ) releases an exclusive lock, and releaseDowngrade( ) atomically downgrades an exclusive
lock to a shared lock. That is, a change has been made to object 108's stateful data, and now the object is to be
made available to other threads in set of multiple threads 110, but the mechanism will still "pin" it or hold it in its

TABLE 3-continued (Release Methods)

current state without letting another intervening request in between releasing the exclusive lock and acquiring the shared lock.

TABLE 4

(Wait Methods)

\* public void waitFor(T state);
\* public void waitForHold(T state);
Wait for a certain state. If a thread of execution requires object 108 to be at a certain state and it may or not be in that state yet, use one of these methods to "park" the running thread until the state is reached. The "Hold" variant acquires the shared lock once the state machine controller 112 has entered the target state. If the target state is unreachable from the current state or from a state that is entered while waiting, an exception is thrown (and no lock is acquired). This is significant because these methods allow, for example, the initiation of a connect operation, followed by the performance of some other work, and then a wait period for the connection to become ready without risking entering a "wait forever" type of loop.
\* public T waitForNot(T state);
\* public T waitForNotHold(T state);
The same as the prior methods, except these methods wait for the state machine to exit the given state. Same locking semantics; returns the new state.

TABLE 5

(Informational Methods)

\* public T getState( );
\* public T getStateHold( );
\* public T getStateExclusive( );
\* public boolean inHold(T state);
\* public boolean in(T state);
\* public boolean in(T... states);
These methods read the current state, or test for a certain state, optionally grabbing a lock.

TABLE 6

(State Interface)

In embodiments, an additional interface that the enumerated state types can be implemented called "State", which can be defined as:
public interface State<T extends Enum<T> & State<T>> {
  boolean isReachable(T dest);
}
According to embodiments, the interface State takes a type parameter T which corresponds to an enumerated type that implements this interface. So if a class Banana is defined, methods can include:
public class Banana {
  private enum MyState implements State<MyState> {
    GREEN,
    RIPE,
    PEELED,
    EATEN;
    // Used by AtomicStateMachine to detect when the process is waiting for a state that cannot be reached.
    public boolean isReachable(MyState dest) {
      // EATEN is ultimately reachable from all states, PEELED is ultimately reachable from RIPE or GREEN, etc.
      return compareTo(dest) < 0;
    }
  }
  private final AtomicStateMachine<MyState> state = AtomicStateMachine.start(MyState.GREEN);
  ...and later on, in some method:...
  if (state.transitionHold(MyState.PEELED, MyState.EATEN)) try {
    System.out.println("Delicious banana");
    System.out.println("No other process can modify the banana while occupied but can view banana if desired");
  } finally {
    state.release( );
  } else {
    System.out.println("Banana not peeled yet");
  }
  ...etc...
}
Other classes, procedures, methods and parameters can be used.

Figure 3:
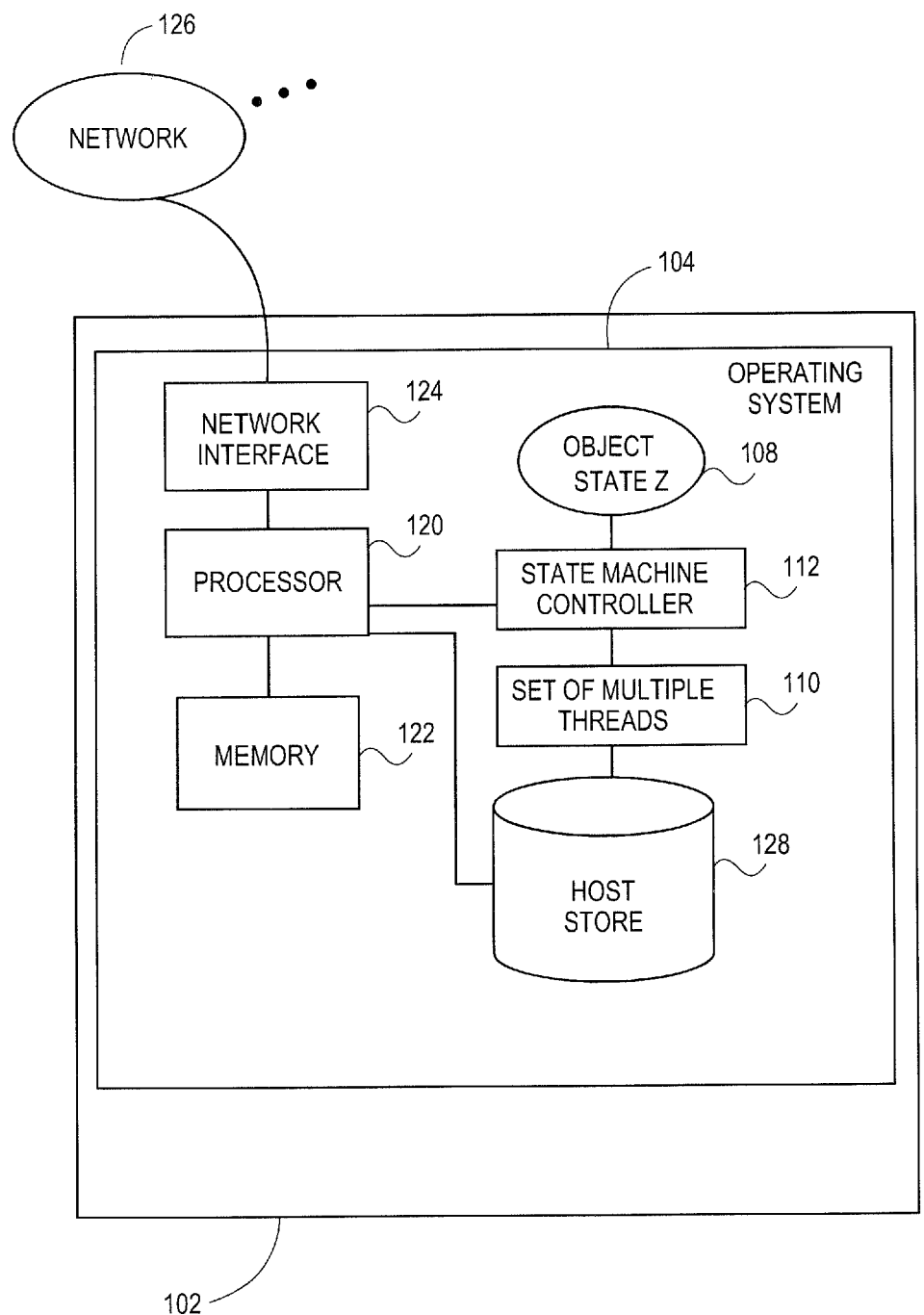
FIG. 3 illustrates an exemplary hardware configuration for hosting one or more objects and threads, according to various embodiments.

FIG. 3 illustrates an exemplary configuration of host machine 102 in which systems and methods for a shared object lock under state machine control can be operated, according to embodiments. In embodiments as shown, host machine 102 can comprise a processor 120 communicating with memory 122, such as electronic random access memory, operating under control of or in conjunction with operating system 104. Operating system 104 can be, for example, a distribution of the Linux™ operating system, the Unix™ operating system, or other open-source or proprietary operating system or platform. Processor 120 also communicates with host store 128, such as a database stored on a local hard drive. Processor 120 further communicates with network interface 124, such as an Ethernet or wireless data connection, which in turn communicates with one or more networks 126, such as the Internet or other public or private networks. Processor 120 also communicates with state machine controller 112, set of multiple threads 110, object 108, and other resources to control the operation of object 108, including to regulate access of set of multiple threads 110 and other processes to object 108 and/or resources controlled or accessed via object 108. Other configurations of host machine 102, associated network connections, and other hardware and software resources are possible.

Figure 4:
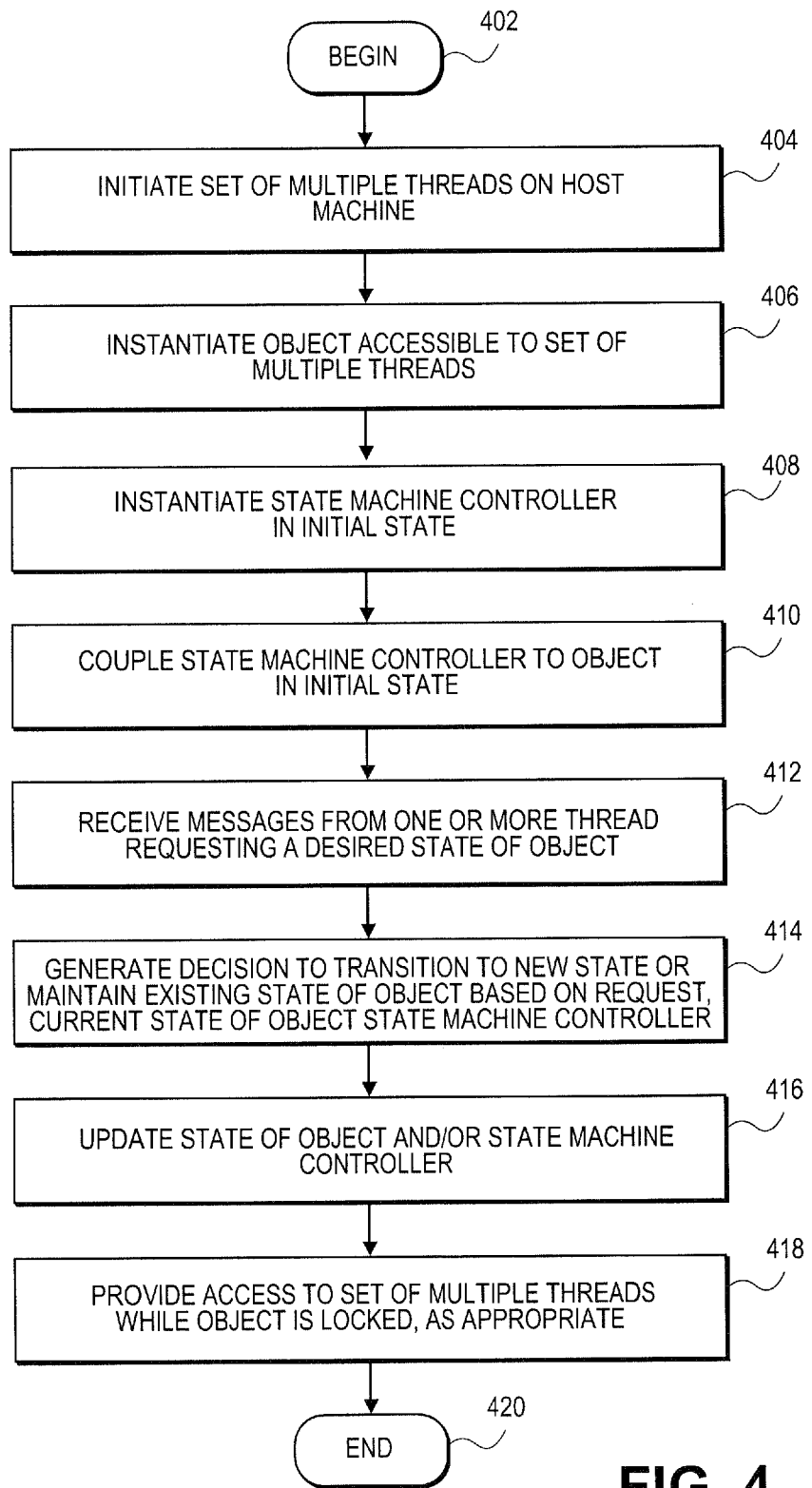
FIG. 4 illustrates a flowchart of overall shared object locking under state machine control, according to various embodiments.

FIG. 4 illustrates a flowchart of overall shared lock processing of an object operating under control of a state machine, according to embodiments. In step 402, processing can begin. In step 404, a set of multiple threads 110 can be instantiated on host machine 102. Set of multiple threads 110 can be or include, for example, executing threads or processes of one or more applications hosted or run on host machine 102 under control of operating system 104 or virtual machine environment 106.

In step 406, object 108 can be instantiated on host machine 102, for example by instantiation from a set of state-defining classes 114 hosted or configured on host machine 102. In step 408, a state machine controller 112 can be instantiated on host machine 102 in an initial state. In embodiments, object 108 can be accessible to set of multiple threads 110 via state machine controller 112. In embodiments, state machine controller 112 can be associated with or correspond to a set of state machine controller classes 116, each class of which corresponds to a state of state machine controller 112. In step 410, the state of state machine controller 112 can be coupled to object 108 in an initial state. For instance, in embodiments, object 108 can be placed into an unlocked initial state, and state machine controller 112 can be instantiated initially from an object class for an unlocked state.

In step 412, a message can be received from one or more thread of set of multiple threads 110 in state machine controller 112 requesting a desired state of object 108. For instance, a thread can request that object 108 be placed into a locked state. In step 414, state machine controller 112 can generate a decision to transition object 108 to a new state, or to maintain object 108 in an existing state. State machine controller 112 can generate a decision regarding a transition of object 108 based on the request received from set of multiple threads 110, the existing state of state machine controller 112, and/or the state or output of object 108. In step 416, the state of object 108 and/or state machine controller 112 can be updated to reflect a new state, as appropriate. For example, object 108 can be placed in a locked state, in which object 108 can be assessed by other processes or software other than set of multiple threads 110. In step 418, set of multiple threads 110 can be provided shared access to object 108 in the case where object 108 is in a locked state, as appropriate. In step 420, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which object 108 can be in a locked state or unlocked state, in embodiments object 108 can have other states, such as a sleep or power-saving state, an error correction state, an encryption state, or other states, modes or conditions. Also for example, while embodiments have been described in which a single state machine is configured to control one object, in embodiments a single state machine can be configured to control multiple objects. For further example, while embodiments have been described in which a single state machine is configured to control one object, in embodiments multiple state machines can be configured to control one object. In yet further embodiments, multiple state machines can be configured to control multiple objects, either independently or cooperate with two or more state machines cooperating with each other. For still further example, while embodiments have been described in which the set of multiple executing threads under control of the state machine are hosted on one host machine, in embodiments the set of multiple executing threads can be hosted on different machines or hosts. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
  instantiating, by a processor, a state machine coupled to an object having a plurality of states, wherein the object corresponds to an object class defining the plurality of states;
  receiving, by the state machine, a message from a first executing thread of a plurality of executing threads requesting placement of the object in a locked state;
  executing, by the state machine in view of the message from the first executing thread, a decision regarding placement of the object into the locked state in view of the received message; and
  providing, by the state machine, the plurality of executing threads with access to the object in the locked state,
  wherein the state machine cooperates with a second state machine to control the object in response to the received message and the decision regarding placement of the object into the locked state.

2. The method of claim 1, wherein the object comprises at least one of a storage input/output object, a network interface object, or a memory object.

3. The method of claim 1, wherein the plurality of executing threads comprises a plurality of executing program threads.

4. The method of claim 1, wherein a state of the object is shared between the plurality of executing threads.

5. The method of claim 1, wherein the plurality of executing threads are hosted in at least one of an operating system environment or a virtual machine environment.

6. The method of claim 1, wherein the decision comprises changing a state of the object.

7. The method of claim 1, wherein the decision comprises maintaining a state of the object.

8. The method of claim 1, wherein the plurality of states of the object comprises the locked state of the object and an unlocked state of the object.

9. A system comprising:
an interface to a plurality of executing threads; and
a state machine executed by a processor, the state machine coupled to a object having a plurality of states, wherein the object corresponds to an object class defining the plurality of states, the state machine to:
  receive a message from a first executing thread of a plurality of executing threads requesting placement of the object in a locked state,
  execute, in view of the message from the first executing thread, a decision regarding placement of the object into the locked state in view of the received message; and
  provide the plurality of executing threads with access to the object in the locked state,
  wherein the state machine cooperates with a second state machine to control the object in response to the received message and the decision regarding placement of the object into the locked state.

10. The system of claim 9, wherein the object comprises at least one of a storage input/output object, a network interface object, or a memory object.

11. The system of claim 9, wherein the plurality of executing threads comprises a plurality of executing program threads.

12. The system of claim 9, wherein a state of the object is shared between the plurality of executing threads.

13. The system of claim 9, wherein the plurality of executing threads are hosted in at least one of an operating system environment or a virtual machine environment.

14. The system of claim 9, wherein the decision comprises changing a state of the object.

15. The system of claim 9, wherein the decision comprises maintaining a state of the object.

16. The system of claim 9, wherein the plurality of states comprises the locked state of the object and an unlocked state of the object.

17. A non-transitory computer readable medium, the computer readable medium comprising instructions to cause a processor to execute operations comprising:
  instantiating, by the processor, a state machine coupled to a single object, the single object having a plurality of states, wherein the object corresponds to an object class defining the plurality of states;
  receiving, by the state machine, a message from at least one of a plurality of executing threads requesting placement of the object in a locked state;
  executing, by the state machine in view of the message from the at least one of the plurality of executing threads, a decision regarding placement of the object into the locked state in view of the received message; and
  providing, by the state machine, the plurality of executing threads with access to the object in the locked state,
  wherein the state machine cooperates with a second state machine to control the object in response to the received message and the decision regarding placement of the object into the locked state.

18. The non-transitory computer readable medium of claim 17, wherein the object comprises at least one of a storage input/output object, a network interface object, or a memory object.

* * * * *